July 28, 1925.
B. C. McCRACKEN
1,547,935
COMBINED MOVING PICTURE PROJECTOR AND CAMERA
Filed April 4, 1923     3 Sheets-Sheet 2
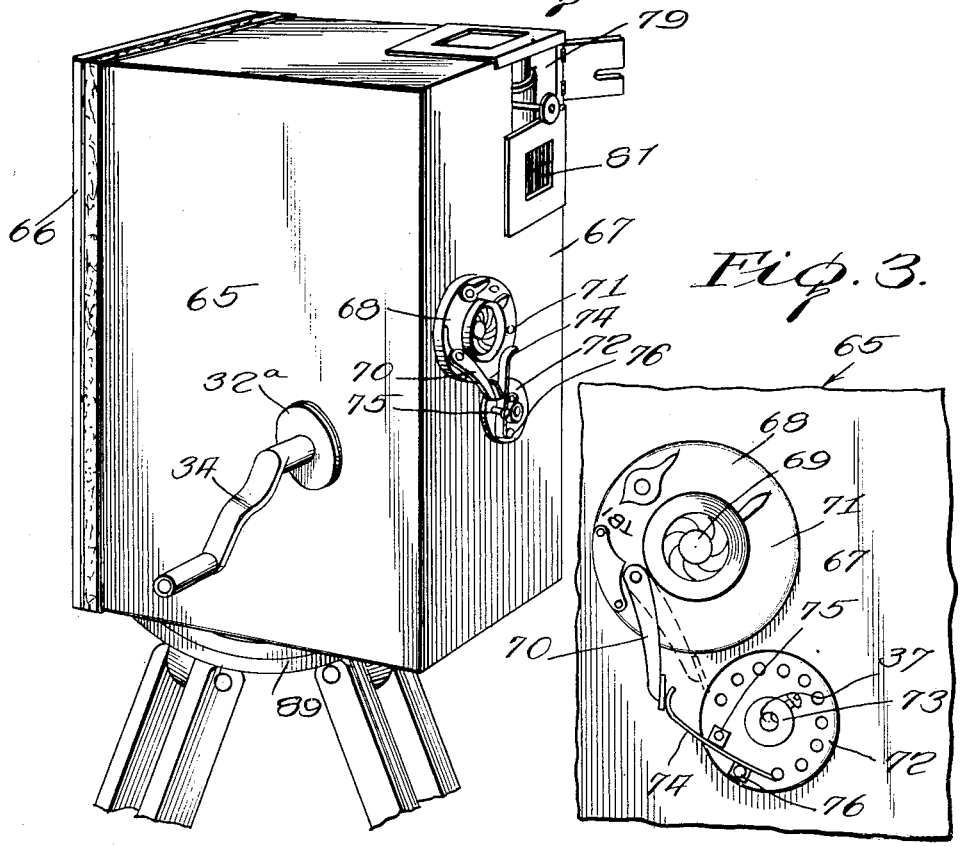
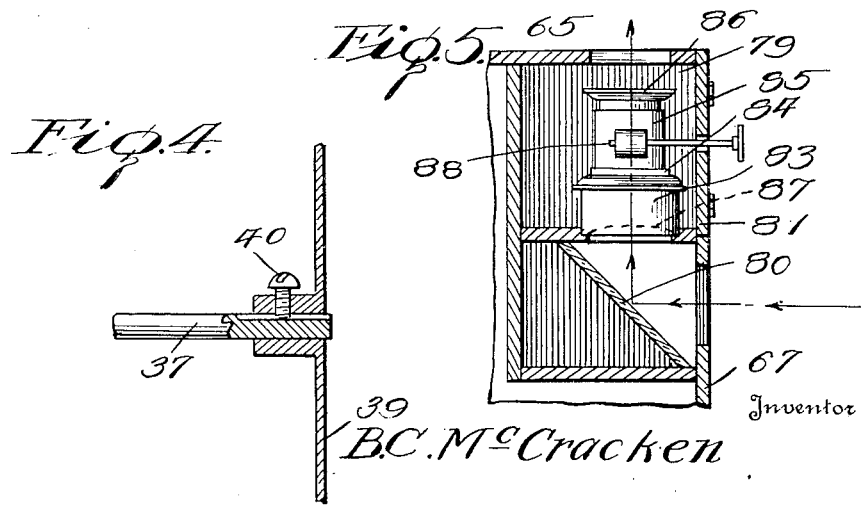
Inventor
B. C. McCracken
By Watson E. Coleman
Attorney July 28, 1925. 1,547,935
B. C. McCRACKEN
COMBINED MOVING PICTURE PROJECTOR AND CAMERA
Filed April 4, 1923 3 Sheets-Sheet 3
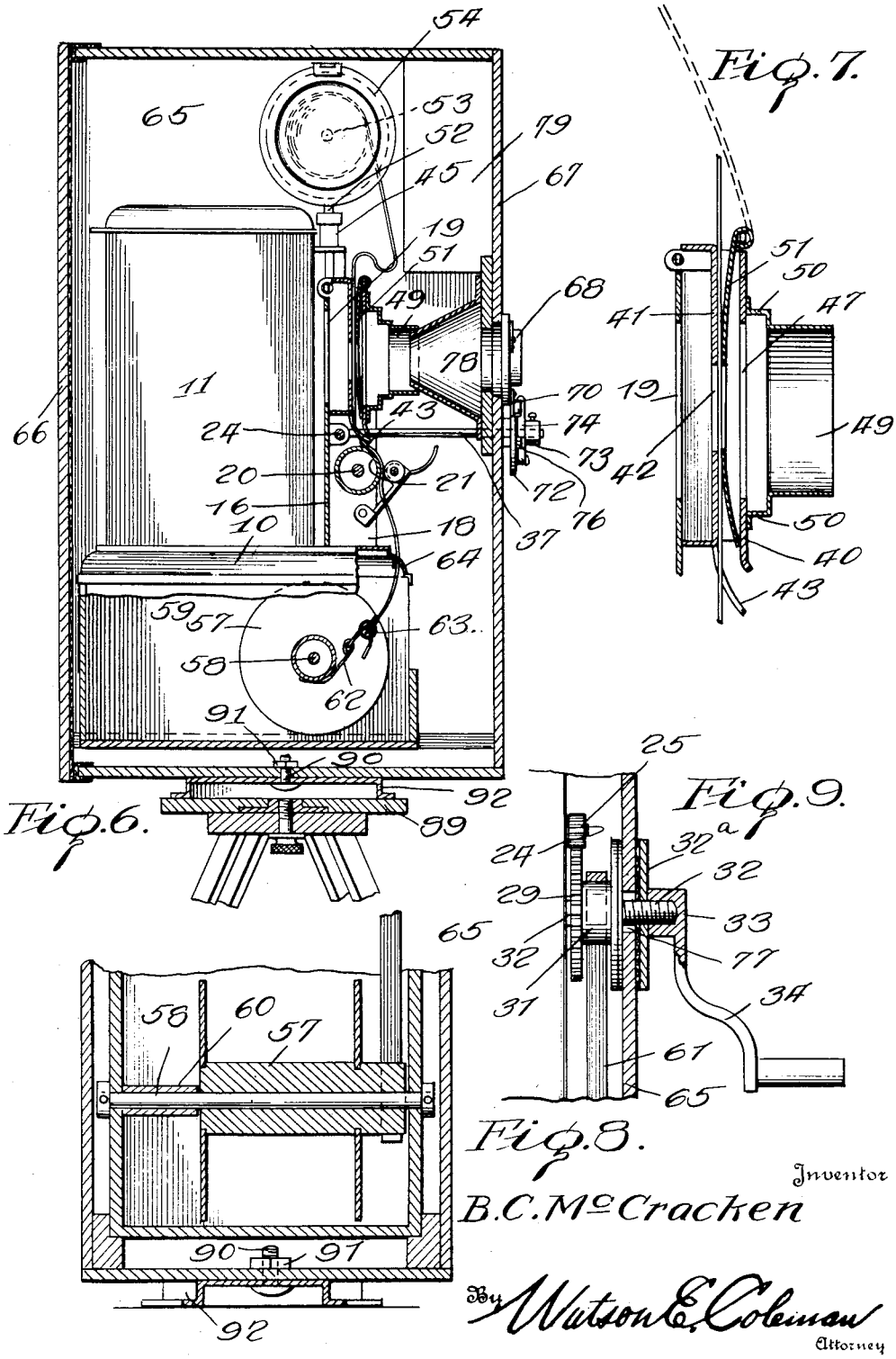
Inventor
B.C. McCracken
By Watson E. Coleman
Attorney Patented July 28, 1925.

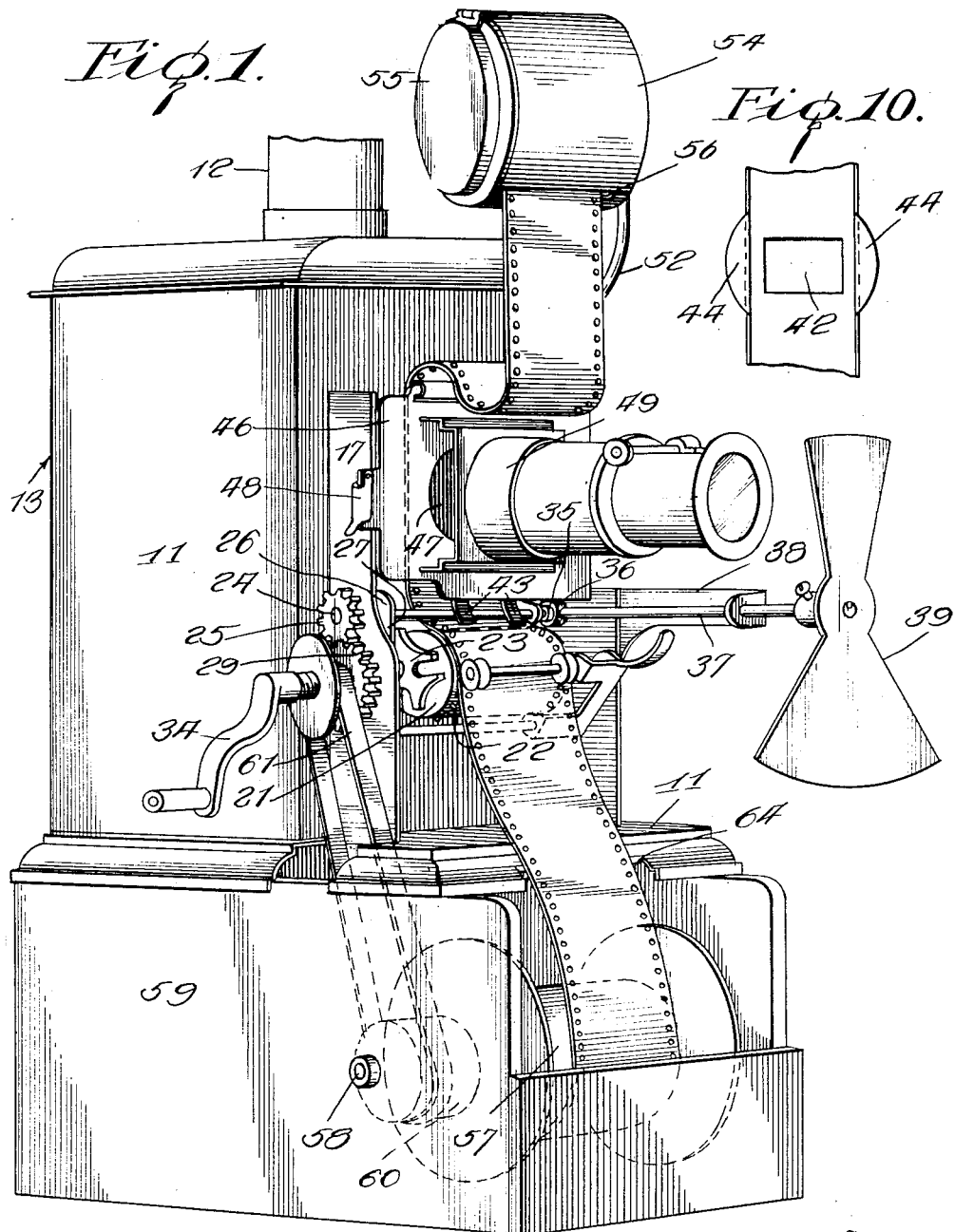

1,547,935

UNITED STATES PATENT OFFICE.

BESSIE C. McCRACKEN, OF DENTON, MONTANA.

COMBINED MOVING-PICTURE PROJECTOR AND CAMERA.

Application filed April 4, 1923. Serial No. 629,813.

*To all whom it may concern:*

Be it known that I, BESSIE C. MC-CRACKEN, a citizen of the United States, residing at Denton, in the county of Fergus and State of Montana, have invented certain new and useful Improvements in Combined Moving-Picture Projectors and Cameras, of which the following is a specification, reference being had to the accompanying drawings.

This invention relates to machines for taking and projecting moving pictures, and particularly to means whereby an ordinary relatively simple moving picture projecting apparatus of a relatively cheap character such as is used not only for projecting moving pictures but for projecting lantern slides may be converted into and used for the purpose of taking moving pictures and afterwards projecting them.

A further object in this connection is to provide a light-tight casing within which this moving picture apparatus is disposed and entirely housed, this casing being provided with means for supporting either the projecting lens or lens combination of the moving picture apparatus or a photographic lens, and in this connection to provide means on the shutter operating shaft of the moving picture projecting apparatus for operating the shutter of the lens so that the shutter will open when the unexposed section of film rides before the lens and the shutter will close immediately thereafter.

A still further object is to provide means whereby the moving picture mechanism may be operated from the exterior of the casing or housing, whereby the shutter may be removed from the shutter shaft or mounted thereon when it is desired to project the pictures which have been taken by the camera lens, and to provide improved means for supporting the reel of unexposed film or the reel of film which is to be projected, and improved means for engaging the free end of the reel of unexposed film or of the film to be projected with a taking-up reel, and to provide means whereby this taking-up reel is operated in consonance with the means for feeding the film through the apparatus.

Another object is to provide a finder upon the casing so that an operator when taking pictures may keep the object being taken in constant view.

Other objects will appear in the course of the following description.

My invention is illustrated in the accompanying drawings, wherein:—

Figure 1 is a perspective view of a motion picture projecting machine of standard make, showing certain changes and additions therein, whereby to adapt it for use in taking motion pictures;

Figure 2 is a perspective view of the casing within which the motion picture machine shown in Figure 1 is disposed for the taking of motion pictures;

Figure 3 is an enlarged fragmentary face view of the front of the casing;

Figure 4 is a sectional view through the shutter of the shutter shaft;

Figure 5 is a sectional view through an upper corner of the casing, showing the finder compartment;

Figure 6 is a vertical sectional view through the casing extending from front to rear;

Figure 7 is a sectional view of the gate through which the film passes;

Figure 8 is a sectional view through the take-up reel;

Figure 9 is a fragmentary sectional view through the casing, showing the reel actuating means on the driving shaft and the detachable crank;

Figure 10 is a front elevation of the plate 41.

In the use of my invention, I have illustrated and may make use of an ordinary relatively cheap moving picture projecting lantern which is also adapted for projecting magic lantern views. This lantern is disposed within a casing in accordance with my invention, but before describing the casing and the manner in which the lantern is disposed therein I will describe the lantern itself.

The lantern comprises a base 10 having a lantern box 11 of usual form and adapted to contain a lamp therein or to contain an electric light. If a lamp is mounted within the casing, the casing is provided with a chimney 12 and the rear end of the casing is provided with the usual door 13 having a reflector attached. The forward end of the lamp house is provided with the usual condensing lens (not shown). This housing 11 and the base are formed of thin metal. Mounted upon the base in advance of the lamp house 11 is a support consisting of a sheet metal back piece 16 having its sides bent outward, as at 17 and 18. The rear face of this sheet metal support is cut out, as at 19, this aperture being in alignment with the condensing lens 15.

Disposed upon a shaft 20 extending transversely through the supports 17 and 18 is a barrel 21 having sprocket teeth 22 thereon, this barrel rotating loosely upon the shaft 20 and being operated by a Geneva movement comprising the usual Geneva wheel 23 of usual form. Extending parallel to the axis of the drum 21 is the shaft 24, the outer end of which carries a gear wheel 25, this shaft carrying upon it a disk 26 fitting the concave peripheral recesses of the wheel 23 but formed with a radially projecting arm 27 having an inwardly projecting stud (not shown but of ordinary construction) which engages the radially slotted portions of the Geneva wheel between the concave recesses. This Geneva movement is well known and needs no additional description, it being understood, however, that as the shaft 24 revolves the arm 27 will give the star wheel 23 and the barrel 21 a movement through the small arc of a circle, and that as soon as the stud has escaped from the slots of the Geneva wheel the circular portion of the wheel engaging the peripheral recesses will hold the Geneva wheel and, therefore, the drum 21 from any movement until the radial arm against operatively engages the teeth of the wheel 23.

Mounted upon one end of the shaft 24 is the gear wheel 25, as before stated, and this meshes with a gear wheel 29 mounted for independent rotation with reference to the star wheel 22 and the drum 21, which gear wheel is mounted upon a shaft 30. This shaft carries upon it a band wheel 31 which is disposed next to the gear wheel 29. The exterior of the outer end of the shaft 30 is screw-threaded at 32 and adapted to be detachably engaged with this screw-threaded end of the shaft is a nut-like cap 33 carrying a crank 34 which constitutes the crank whereby the machine is operated. This shaft 32 also carries upon it the opposed disks 32ª which engage on each side of the outer casing, as will be later described, to prevent the entrance of light into this outer casing through the aperture for the passage of the shaft 32.

The shaft 24 carries at one end a beveled gear wheel 35 which meshes with a beveled gear wheel 36 upon a shutter shaft 37 mounted upon a bracket 38 extending outward from the side member 18. When this machine is used for projecting moving pictures, a shutter of usual form and designated 39 is attached to this shaft. This shutter is held in place by a set screw 40 and the end of the shaft 37 is so formed that the shutter can only be set in one position on the shaft. This position is such that the shutter will time properly or be properly correlated with the movement of the film. At the same time this permits the shutter to be readily removed when the apparatus is to be used for taking moving pictures.

Supported upon the plate 16 and preferably forming part thereof and extending downward in front of this plate is a plate 41 formed with an oblong aperture 42, illustrated as having its longer axis in a horizontal plane, this plate being formed at its lower edge with the outwardly and downwardly curved lugs 43 and on its sides with the laterally disposed wings 44.

Hinged in any suitable manner upon the plate 16 and specifically shown as hinged upon a vertically extending tubular member 45 is a gate 46 having a central, circular aperture 47. This gate is adapted to be closed against the wings 44 and latched by means of a latch 48. The front of this gate carries the tube section 49 which is held spaced from the front of the plate by means of the guides 50 constituting means for supporting and guiding a lantern slide when the machine is used for projecting lantern slides. Hinged to the upper end of the gate and disposed on the inside face thereof is a normally convex spring plate 51 having a rectangular aperture therein just the size of the moving picture to be taken or projected and just the size of the aperture 42 of plate 41. Inasmuch as this plate 51 is somewhat resilient and inwardly bowed, it will press the film against the plate 41 when the gate is closed, holding the film flat and giving sufficient frictional resistance to the passage of the film.

So far, I have described a construction which, except in certain details, is such as is commonly used for projecting moving picture films or lantern slides, except that in the ordinary devices of this character the crank 34 is normally fast upon the shaft which supports the gear wheel 29 and no band wheel 31 is mounted upon this shaft. In this form of moving picture projector, the moving pictures are ordinarily disposed upon a continuous strip and not mounted upon a magazine drum and taken off by a reeling-up drum. I have provided, therefore, means for supporting the magazine drum which comprises a rod 52 mounted in the tubular member 45 and extending up therefrom, this rod being bent laterally at 53. Mounted upon the laterally bent portion of this rod is a circular casing or housing 54 held to the rod by a set screw or in any other suitable manner, this casing being open at one end and having a cover 55 but closing this open end of the casing and the casing being formed with a slot 56 through which the film passes. The film on its spool is disposed on the rod 54 and the end threaded through this opening 56 and downward between the plate 41 and the gate 46 and over the barrel 21. The film is wound up upon a spool 57 loosely mounted upon a shaft 58 and extending transversely through a supporting base 59. The spool 57 also has mounted upon it a band wheel 60 disposed directly beneath the band wheel 31, and a band 61 or equivalent device engages these band wheels so that the spool 57 is driven from the band wheel 31 at a proper speed to wind up the film as it is allowed to pass by the Geneva movement. Mounted upon the spool 57 is a flexible strip 62 having a clip 63 at one end which is adapted to engage the free end of the film and draw it downward until it is wound up upon the spool.

As illustrated, the forward edge of the base 10 is cut away at 64 for the passage of the film, this cut away edge being rounded so that it will not in any way damage the film. Any other suitable means might be used to permit the passage of the film through the base. Of course, the base is cut away for the passage of the band 61. The base 10 may be attached upon this base housing 59 in any suitable manner and, of course, might be made as a part thereof.

So far, except in the items which I have pointed out, the machine which I have described is on the market and is well known. This machine is ordinarily used simply for the projection of moving picture films and for the projection of lantern slides. If, however, this machine was used for the taking of moving pictures by disposing in front of the tubular member 49 a photographic lens instead of a projecting lens, the machine would be open to the very vital objection that the sensitized film passing from the magazine 54 would, of course, be affected by light and the same would be true after it would pass the gate, and that inasmuch as the tubular member 49 is spaced from the gate 46 that light would pass in through the lantern guides and act upon the film so that as it is ordinarily constructed the ordinary projecting camera of this type is not adapted for the taking of moving picture films and if it was adapted for this purpose by housing in the film operating mechanism and the reels, it would not be adapted for the projection of lantern slides.

For the purpose of rendering this mechanism which has heretofore been described capable of taking moving pictures as well as projecting them, I provide an outer light-tight case, designated generally 65. This case is rectangular in cross section and of a width sufficient to contain the base 59 and the lamp housing. The rear end of this case or any other portion of it might be provided with a door 66 permitting access to the interior of the case. The case is formed with an aperture in its front wall 67 and detachably engaged with the wall 67 upon the exterior thereof is a lens box or carrier 68 of the usual type carrying a photographic lens 69 and provided with the usual diaphragm mechanism and the usual shutter mechanism. I have not illustrated the shutter mechanism, as this may be of any usual or suitable type, but the shutter mechanism includes a trip member 70 which is spring projected in one direction and which, when depressed, operates the shutter. Lens boxes 68 of this character are provided with the usual shutter mechanism such as are found in kodaks and other like cameras having means whereby the shutter may be set so as to take snap shots, whereby it may be set for time exposures or for relatively slow exposures, in other words for fast, slow and time, and means whereby the diaphragm opening and Iris diaphragm may be adjusted. My invention has nothing to do with the shutter used, with the setting apparatus thereof or with the particular form of diaphragm and its actuating means, nor with the tripping device, and I wish it understood that any form of lens box with its lens shutter, diaphragm and shutter tripping device might be used. This lens box 68 I have shown as attached to the front of the box by means of screws 71 but any other means of attachment might be used. The front of the casing 67 is formed with an aperture through which the outer end of the shaft 37 passes, and when the device is designed to be used for taking moving pictures the mechanism illustrated in Figure 1 is inserted within the casing 65, with the shaft 37 projecting through the opening thereof, the revolving shutter 39 being previously removed from the shaft 37, and a tripping device is disposed upon the shaft 37 comprising a disk 72 having a central hub 73 through which passes a set screw adapted to engage the shaft and hold the tripping device set thereon. Mounted upon the stud projecting from the tripping device is a spring finger 74 which bears against a stop 75 carried by the disk, this spring being held by a stud 76 extending through the disk. The spring extends out tangentially with relation to a circle whose center is the axis of rotation of shaft 37. The spring finger is curved at its extremity in a direction reverse to its direction of rotation and when this tripping device is in place upon the shaft and the shaft 37 turns in a counter-clockwise direction, the end of this tripping finger 74 will sweep across the end of the trip 70, depress this trip sufficiently to actuate the shutter, and then release the trip so that the trip will immediately return to its normal position again.

The side of the casing 65 is formed with an aperture 77 through which the screw-threaded end of the tubular shaft 30 passes so as to permit the crank 33 to be engaged with this shaft 30. Disposed within the casing 65 and against the front wall 67 thereof is a cone 78 which has its large end attached to the wall in any suitable manner and preferably detachable therefrom and its small end normally fitting within the sleeve or tubular member 49. This cone 78 is preferably made of flexible material sufficiently stiff to stand out so as to engage the tubular member, this material being black so as to prevent any possible reflection of light rays and prevent light rays from entering the aperture 68 and not passing through the sleeve 49.

In order to permit the casing 65 to be directed toward the object of which a moving picture is to be taken, the casing is provided with a finder. This finder consists of a rectangular compartment 79 formed in one of the upper corners of the casing, this compartment 79 at its upper end having an inclined mirror 80 and the front of the compartment being formed with an aperture 81 through which the image may pass to the mirror. The mirror reflects light upward through an aperture in a horizontal seat 82 extending across the compartment and the upper end of the compartment has a rectangular aperture the size of the picture to be taken upon the film. A lens may be used for viewing the image reflected in the mirror 80, and for this purpose I have found the ordinary projecting lens combination of the projecting machine particularly adapted. This lens combination, as illustrated in Figure 5, consists of a relatively large tubular body portion 83 and with a reduced tubular portion 84. Telescoping through this reduced tubular portion is the tube 85 of an eye piece 86 and the body 83 carries an objective 87. The eye piece is adjusted toward or from the objective by means of a rack and pinion operated by means of a shaft 88. When the machine is to be used for projecting purposes, the lamp box and the film moving mechanism with its magazines and reels is removed from the casing and used in the ordinary manner, as will be later stated. When the apparatus is to be used for taking moving pictures, then the eye piece is disposed within the finder compartment as illustrated. Any other lens, however, may be used for the finder compartment.

Preferably, though not necessarily, the bottom wall of the casing 65 is rotatably mounted upon a support 89 which has a bolt 90 extending upward through the bottom of the casing and adapted to receive a nut 91 on the inside of the casing, there being a washer 92 of relatively large size upon which the bottom of the casing 65 rests. This member 89 is provided with a screw hole whereby a tripod may be screwed on, just as in any other camera, and this construction permits the moving picture camera to be shifted in any desired direction without trouble.

Means may be provided within the casing whereby the supporting base 59 for the projecting apparatus may be guided into place so that the sleeve 49 will be in exact axial alignment with the opening through the front wall of the casing and so that the shaft 37 will pass through the opening in the front wall without any adjustment being necessary for the projecting apparatus. Means may be also provided for holding this projecting apparatus tightly engaged within the casing at exactly its right position and yet permit the removal of the projecting apparatus from the casing.

It will be noted that this construction does not in any way interfere with the use of the device as a projecting apparatus. When it is desired to use the device as a projecting apparatus, the base 59 with the lamp housing and film operating means may be readily withdrawn from the casing 67 and then after the film to be projected has been threaded through the gate and over the barrel 21, the film may be moved past the lens by simply rotating the crank handle 34 in an obvious manner. The device may be used obviously for projecting lantern slides, in which case, of course, the bowed spring member 51 may be turned up out of the way. Of course, when the device is used for projecting moving pictures the shutter 39 is mounted upon the shaft 37. This shaft is notched at one point for the engagement of a set screw on the hub of the shutter so that the shutter cannot be disposed in any manner except in its right position with relation to the film feeding mechanism. When it is desired to use the projecting mechanism for the purpose of taking moving pictures, the projecting mechanism with its supporting base is inserted within the casing 65, care being taken that the sleeve 49 extends against the small end of the cone 78 and with the shaft 37 passing out through the proper aperture in the front wall 67. Then the trip wheel 72 is mounted upon the shaft so that a set screw will engage in the longitudinal groove in the shaft in the same manner as the shutter was mounted and then the crank handle is attached to the shaft 30 by screwing it upon the end of the shaft and then assuming that the film has been loaded into the magazine 54, threaded through the film feeding mechanism and engaged with the clip 63. The apparatus is then ready for use. Under these circumstances, upon turning the crank 34 the mechanism will be operated to give an intermittent movement to the film and each time that the film comes in front of the gate the tripping device on the shaft 37 will actuate the lens shutter and a snap shot will be taken upon the film. When the film has been completely exposed and is wound upon the lower reel, this film is removed therefrom in a dark room and developed and fixed in the usual manner.

It will thus be seen that I have provided means whereby a very cheap form of moving picture projecting apparatus may be used for taking moving pictures. It will be seen that by use of the casing 65 and by making the crank 34 removable from and attachable to the main operating shaft and making the shutter 39 removable and providing means for operating the camera shutter mounted upon this shaft that I can use an ordinary projecting apparatus as the means for taking moving pictures without any material change in the projecting apparatus. The films may be bought in fifty-foot lengths, which I find are particularly adapted to be used with moving picture apparatus of this character, but obviously the machine might be constructed to use film of much greater length.

While I have illustrated a construction which has been found to be thoroughly effective and entirely practical in actual practice, I do not wish to be limited to the details of this construction, as it is obvious that many of these details might be changed without departing from the spirit of the invention and that other forms of moving picture and lantern slide projectors now on the market might be used in place of the particular form of projector which I have described and shown.

I claim:—

1. The combination with a moving picture projector including a shutter shaft, a removable projecting lens system, means for moving a strip of film step by step past the optical axis of the lens system and for rotating the shutter, of a light-tight case within which the projector may be disposed and having an aperture in its front coincident with the optical axis of the projector when the projector is disposed within the case and an aperture coincident with the shutter shaft, a lens mount disposed in the case coincident with the first named aperture and having a shutter and a trip therefor, a tripping device detachably mounted on the shutter shaft and intermittently engaging with the lens shutter trip, and means on the exterior of the case for driving the film feeding mechanism and rotating the shutter shaft.

2. The combination with a moving picture projector including a shutter shaft, a removable projecting lens system, mechanism for moving a film step by step past the optical axis of the lens system, of a light-tight case within which the projector may be disposed having an aperture in its front coincident with the optical axis of the projector when the projector is disposed within the case and having an aperture coincident with the shutter shaft, a lens mount on the exterior of the case coincident with said first named aperture and having a lens shutter and a trip therefor, a tripping device detachably mounted on the shutter shaft and operatively engageable with the lens shutter trip, a take-up reel disposed within the case, means on the exterior of the case for driving the film feeding mechanism, actuating the shutter shaft and driving said take-up reel, and a magazine reel mounted within the case.

3. The combination with a moving picture projector including a shutter shaft, a removable projecting lens system, a magazine reel mounted upon the projector, a take-up reel mounted below the projector, means for shifting the film from the magazine reel past the lens system step by step, of a light-tight case within which the projector may be disposed and from which the projector is removable having an aperture in its front coincident with the optical axis of the projector when the projector is disposed in the case and having an aperture coincident with the shuter shaft, a lens mount on the case coincident with the first named aperture and having a lens shutter and a trip therefor, a tripping device detachably mounted on the shutter shaft for rotation therewith and intermittently engageable with the lens shutter trip, and manually operable means on the exterior of the case for operating said film feeding mechanism, the shutter shaft and the take-up reel.

4. The combination with a moving picture projector including a shutter shaft, a removable projecting lens system, film feeding means including a rotatable barrel over which the film is adapted to pass, means for giving an intermittent rotation to the barrel including a shaft having a screw-threaded extremity, a magazine reel supported upon the projector, a take-up reel disposed below the projector and upon which the film is adapted to be wound up, of a light-tight case within which the projector may be disposed and having an aperture in its front coincident with the shutter shaft and through which the shutter shaft may be projected, an aperture in one side through which the driving shaft may be projected and a second aperture in its front coincident with the optical axis of the projector when the projector is disposed within the case, a lens mount on the case coincident with said last named aperture and having a shutter and a trip therefor, a tripping device detachably mounted on the shutter shaft and rotatable therewith and adapted to intermittently engage with the lens shutter trip as the shutter shaft is revolved, a crank having an interiorly screw-threaded socket adapted to engage the screw-threaded end of the driving shaft and permit the operation of the driving shaft from the exterior of the case, there being means for preventing the inlet of light through said apertures, and means for driving the take-up reel from the main driving shaft.

5. In a moving picture machine, a case having a lens mount, a photographic lens therein, a shutter for the lens, a trip for the shutter, means for actuating the shutter comprising a shaft extending through the case, a disk mounted upon the shaft and having a plurality of perforations concentric to the shaft, and a tripping member mounted upon the disk for rotation therewith and adapted to intermittently engage the lens trip as the shaft is rotated, said tripping member having attaching means extending through certain of the perforations in the disk and being adjustable through any one of a plurality of positions in the perforations in said disk.

6. A case for permitting the use of a moving picture projector as a moving picture taking machine, the case being sufficiently large to receive within it the picture taking projector and being light-tight, having a door, and being formed in its front wall with two apertures, a light shield attached to the inner face of the front wall and disposed concentric to one of said apertures and extending inward and adapted to be inserted in the lens supporting tube of the taking machine, a lens mount disposed in the last named aperture and including a shutter and a trip therefor, and the other aperture permitting the projection of the shutter shaft of the projector therethrough, and a member adapted to be detachably mounted upon the shutter shaft to intermittently engage said shutter trip as the shutter shaft is rotated.

7. A case for permitting the use of a moving picture projector as a moving picture taking machine, the case being large enough to contain within it the moving picture projector being light-tight, having a door, and being formed in its front wall with two apertures, a conical light shield disposed upon the inside of the front wall of the case and concentric to one of said apertures and adapted to extend into the lens receiving tube of the projector, a lens mount disposed in the last named aperture and including a shutter and a trip therefor, and the other aperture permitting the projection of the shutter shaft of the projector therethrough, a member adapted to be detachably mounted upon the shutter shaft to intermittently engage said shutter trip as the shutter shaft is rotated, the side wall of the case having an aperture through which the driving shaft of the projector is adapted to be extended, and means adapted to be engaged with said driving shaft for rotating the same.

8. The combination with a moving picture projector including a base, a lantern housing, an apertured plate forming the front of the lantern housing, a hinged gate associated therewith and having a forwardly projecting tubular sleeve, a lens system telescopically engaged with said sleeve but movable therefrom, a film reel carried by the projector and having a housing, means disposed below the gate for engaging the film and giving a step by step motion to the film through the gate and past the lens system, a take-up reel mounted below the base of the machine and having means for detachably engaging the end of the film, a driving shaft operatively engaged with the step by step mechanism and the take-up reel, a shutter shaft operatively engaged with said driving shaft and carrying a detachable shutter and a casing within which the projector is adapted to be disposed, said casing having an aperture in its side coincident with the driving shaft of the projector, an aperture in its front through which the shutter shaft may be passed and an aperture coincident with the optical axis of the projector and carrying a lens mount provided with a lens, a lens shutter and a trip therefor, said casing having a finder, a crank handle adapted to be disposed on the exterior of the case and detachably engaged with the driving shaft thereof, and a trip adapted to be mounted upon the shutter shaft and having a resilient finger engageable with the shutter finger to intermittently trip the latter as the shutter shaft is rotated.

9. The combination with a moving picture projector including a shutter shaft, a removable projecting lens system, means for moving a strip of film step by step past the optical axis of the lens system and for rotating the shutter, of a light-tight case within which the projector may be disposed and having an aperture in its front coincident with the optical axis of the projector when the projector is disposed within the case and an aperture coincident with the shutter shaft, a lens mount disposed in the case coincident with the first named aperture and having a shutter and a trip therefor, a tripping device detachably mounted on the shutter shaft and intermittently engaging with the lens shutter trip, means on the exterior of the case for driving the film feeding mechanism and rotating the shutter shaft, the inner face of the front of the case surrounding the first named aperture being provided with an inwardly expanding cone of relatively yieldable material to receive the lens tube of the projector.

10. The combination with a moving picture projector including a shutter shaft, a removable projecting lens system, means for moving a strip of film step by step past the optical axis of the lens system and for rotating the shutter, of a light-tight case within which the projector may be disposed and having an aperture in its front coincident with the optical axis of the projector when the projector is disposed within the case and an aperture coincident with the shutter shaft, a lens mount disposed in the case coincident with the first named aperture and having a shutter and a trip therefor, a tripping device detachably mounted on the shutter shaft and intermittently engaging with the lens shutter trip, means on the exterior of the case for driving the film feeding mechanism and rotating the shutter shaft, and a base plate upon which the case is mounted for rotation around its vertical axis, the base plate having an interiorly screw-threaded socket for the reception of a tripod pin.

In testimony whereof I hereunto affix my signature.

Mrs. BESSIE C. McCRACKEN.